March 10, 1925.
A. L. SYKES
1,529,226
PNEUMATIC BUMPER FOR VEHICLES
Filed May 13, 1924
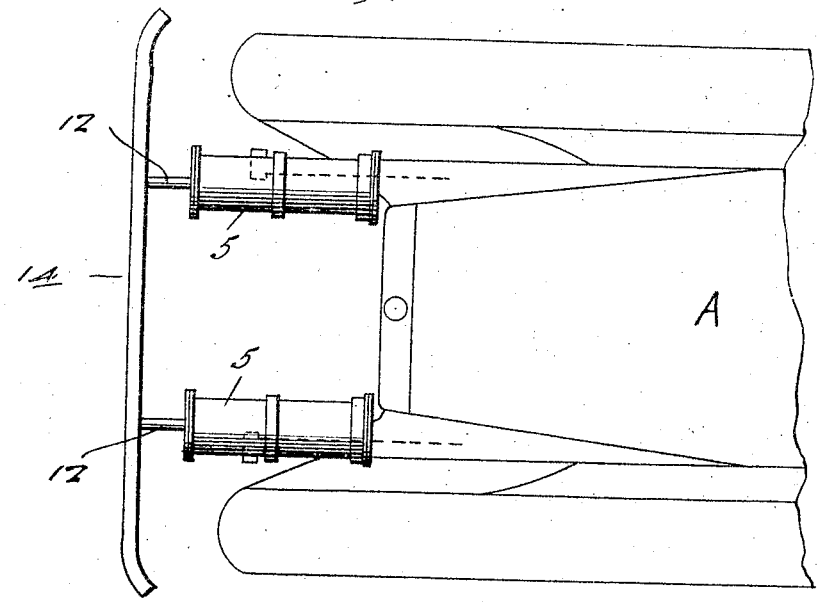
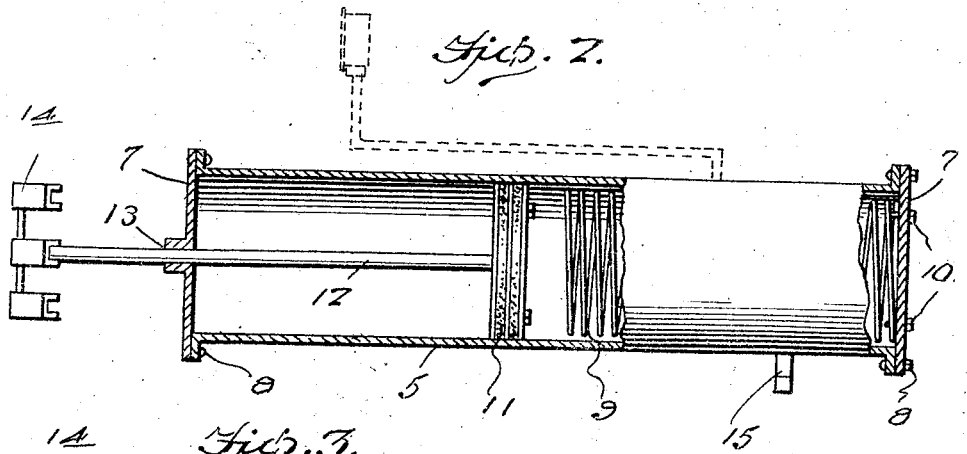
Inventor
A. L. Sykes
By Clarence A. O'Brien
Attorney Patented Mar. 10, 1925.

1,529,226

UNITED STATES PATENT OFFICE.

ARTHUR L. SYKES, OF NORFOLK, VIRGINIA.

PNEUMATIC BUMPER FOR VEHICLES.

Application filed May 13, 1924. Serial No. 713,002.

*To all whom it may concern:*

Be it known that I, ARTHUR L. SYKES, a citizen of the United States, residing at Norfolk, in the county of Norfolk and State of Virginia, have invented certain new and useful Improvements in Pneumatic Bumpers for Vehicles, of which the following is a specification.

This invention relates to vehicle bumpers and more particularly to the type to be installed upon the front and rear ends of automobile machines or street cars, the primary object of the invention residing in the provision of a bumper wherein the same is pneumatically mounted for more fully taking up the shock and impact resultant in the butting of another machine or object, the invention constituting generally a pair of cylinders disposed upon the end of the machine within each of which is movable a piston, the piston being disposed upon one end of a rod that extends outwardly of the cylinder and has attachment to a suitable bumper element per se.

One of the main objects of the invention is to provide a bumper of the foregoing character wherein the striking of objects or other machines by the bumper will not fully disrupt the same as is now the case with practically all types of bumpers upon the market.

A still further object is to provide a bumper, wherein means is provided for permitting the injection of compressed air into the cylinder behind the piston for obviously creating a cushion in back of the piston for preventing the quick reverse movement of the piston within the cylinder when the bumper member strikes an object.

A still further object of the invention is to provide an expansible spring member within the cylinder rearwardly of the piston for providing an additional cushioning means for the piston when the same is moved rearwardly within the cylinder.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views.

Figure 1—is a fragmentary top plan view of an automobile machine equipped with a bumper constructed in accordance with the present invention, Figure 2—is a detail longitudinal sectional view through one of the cylinder members of the present invention, for disclosing more clearly the relative position of the before mentioned cushioning spring and the bumper carrying position therein, and Figure 3—is a front elevational view of the bumper construction disassociated from the vehicle.

Now having particular reference to the drawing, my novel bumper construction constitutes the provision of a pair of relatively elongated cylinders 5 that are to be supported in a position parallel to the longitudinal axis of a vehicle A, at either the front or rear end thereof, and at opposite sides of the vehicle through the medium of anchor collars or the like carried by the frame bars of the vehicle, or other desirable supports.

The opposite ends of each cylinder 5 are closed through the medium of end plates 7—7 that are secured to end flanges of the cylinder through the medium of bolts or rivets 8.

Disposed within the inner end of each cylinder 5 is an expansible relatively strong helical spring 9, the inner convolute of which is secured to the adjacent end plate 7, through the medium of suitable connections 10.

Disposed within the cylinder 5 forwardly of the spring 9 for rectilinear movement therein is a desirable form of piston 11 carried upon the inner end of a relatively elongated rod 12, that extends outwardly through a bearing opening 13 in the foremost end plate 7. Secured upon the outer ends of these rods 12 is a desirable form of bumper member 14.

The cylinders 5 are equipped at points adjacent their inner ends with air inlet valves 15, whereby air pressure may be built up within the cylinders behind the pistons for providing air cushioning means for said pistons when the same are forced rearwardly due to the striking of an object by the bumper member 14.

In the use of a bumper construction of this character upon street cars or the like, air may be taken into the cylinders from the usual air line of the street car brake mechanism, it being of course necessary to provide a suitable control valve for injecting air into the cylinders when desirable. In this instance, it will be necessary to provide a suitable form of gauge for each of the cylinders for indicating the pressure of the air injected thereinto.

It will thus be seen that after air pressure has been injected into the cylinders rearwardly of the pistons 11, the engagement of the bumper member 14 with an object will occasion the rearward movement of the pistons 11 within the cylinders which movement will be cushioned due to said air pressure, and an extremely severe contact of the bumper with an object will occasion a further rearward movement of the pistons within the cylinders whereby the same will engage the springs 9 for also assisting the air pressure within the cylinders in cushioning the shock and impact.

It will be apparent that I have provided a highly novel and efficient form of pneumatic bumper construction for vehicles, and even though I have herein shown and described the most practical embodiment of the invention with which I am at this time familiar, it is nevertheless to be understood that minor changes may be made in the invention without departing from the spirit and scope of the appended claim.

Having thus described my invention, what I claim as new, and desire to secure by Letters Patent, is:—

A bumper structure comprising a cylinder, a piston slidably mounted therein, a rod connected with the piston and extending beyond the end of the cylinder, a bumper member mounted upon the rod, the cylinder being provided at a point between the piston and that end opposite the end through which the rod passes with a nipple, through which air may be injected into the cylinder, and a spring housed within the cylinder between the piston and the last mentioned end of the cylinder, and means securing the spring to the last mentioned end of the cylinder.

In testimony whereof I affix my signature.

ARTHUR L. SYKES.